ately reduced temperature over a relatively narrow temperature range. Other objects and details of the invention will be apparent from the following description:

UNITED STATES PATENT OFFICE 2,546,020

MULTIOLEFIN MONOOLEFIN RESIN AND PROCESS OF MAKING THE SAME

William J. Sparks, Westfield, and John D. Garber, Cranford, N. J., assignors to Standard Oil Development Company, a corporation of Delaware No Drawing. Application December 29, 1945, Serial No. 638,514

7 Claims. (Cl. 260—85.3)

This invention relates to high diolefin polymers, relates particularly to copolymers of diolefins and mono olefins, and relates especially to solid, relatively inelastic thermoplastic, non-thermosetting polymers containing substantial equal proportions of a diolefin copolymerized with an isoolefin.

It has been found possible to prepare a considerable number of copolymers of diolefins and mono olefins, but when the proportion of diolefin contained in the copolymerizate is low, and the polymerization is conducted at relatively low temperatures, below about $-40°$ F., the resulting copolymers are rubber-like bodies which cure with sulfur into excellent substitutes for rubber. Alternatively, when the mixture contains more than about 60% of diolefin, the polymers obtained are resinous in character, of low elasticity, although of good strength, but the polymers are thermosetting, and even a moderate heating converts them into insoluble, infusible material which can not be further plasticized.

It is now found that if the percentage of diolefin or multi olefin is kept within the range between a minimum of about 25% or 30% and a maximum of about 60%, the remainder of unsaturated material in the mixture being a substantially pure mono olefin, with the polymerization temperature kept above about $-22°$ F., and below about $+50°$ F., there are obtained solid, relatively inelastic polymers which are thermoplastic, but not thermosetting, which may be melted either in the pure form or in the presence of fillers; and heat molded to any desired shape, without becoming hardened down to an insoluble condition. Accordingly, these materials may be milled, kneaded, extruded and compounded over a wide range of temperatures and with a wide range of fillers in a way which is not possible with higher diolefin polymers.

Thus the invention provides a new, thermoplastic, non-thermosetting, durable, copolymer of a substantial portion of a multi olefin in the proportion of 25 to 60% with a mono olefin in the proportion of 75% to 40%, to produce a hard, solid relatively inelastic, thermoplastic, non-themosetting resin of excellent strength, suitable for mold-shaping processes generally, including both pressure molding and injection molding, with or without fillers, pigments, fabrics and other addition agents: by the procedure of mixing together a multi olefin and a mono olefin in a relatively narrow range of proportions and polymerizing the mixture at a moderately reduced temperature over a relatively narrow temperature range. Other objects and details of the invention will be apparent from the following description:

In practising the invention, there are mixed together a multi olefin and a mono olefin. For the multi olefin, any of the multi olefins having 4 to about 20 carbon atoms per molecule are suitable. Especially suitable are such substances as butadiene, which is the preferred multi olefinic reactant; and also isoprene, chloroprene, piperylene, dimethyl butadiene in all its various isomers, the higher butadienes including 2-butyl butadiene-1,3 and 2,3-dibutyl butadiene-1,3; the non-conjugated diolefin known as dimethallyl, the triolefins myrcene, allo-ocymene, and the like. These substances are preferred but are representative only, since any organic compound having 2 or more units of unsaturation and a carbon atom number within the range between 4 and about 20 are useful in this reaction including such substances as the unsaturated ethers, the compound ethers of a multi olefin and an alykl, aryl or ar-alkyl radical, and the like. Similarly, the halogen-substituted multi olefins are also useful, and any multi diolefin having 2 or more units of unsaturation and a carbon number within the range between 4 and 20 inclusive is usable either singly or in admixture as the multi olefin component of the invention.

For the mono olefins, any of the mono olefins having 5 to about 20 inclusive carbon atoms per molecule are suitable. By this is meant any organic compound having one unit of unsaturation, regardless of the substituents present. The compound may best be defined as a substituted ethylene having more than four carbon atoms. Preferred mono olefins are the various pentenes, both normal and iso; the various hexenes, the various heptenes, styrene, vinyl ethers and particularly the octenes, especially the octene obtained by dimerizing isobultylene, known to those skilled in the art as "dimer." (Isobutylene does not yield a satisfactory hard resin, since its polymerization rate is so much greater than that of the diolefin that it tends to produce a rubbery type material containing relatively small amounts of the multi olefin.)

The mixed multi-ene and mono-ene may be diluted with suitable diluents such as the halogenated aliphatic compounds or the lower saturated hydrocarbons, or the like, depending upon the characteristics desired in the resin, and the method of recovery to be used. Any of the lower freezing, halogen substituted, aliphatic hydrocarbons are suitable as diluents, including ethyl and methyl chloride, chloroform, ethylene dichloride, the various organic fluorides having up to about 20 carbon atoms per molecule, the various fluoro chlorides up to about the same molecular carbon number and the lower hydrocarbons up to about 20 carbon atoms per molecule are suitable as diluents. It is required merely that the diluents be liquid at the reaction temperature and inert with respect to the polymerization reaction, and accordingly any inert liquid diluent may be used.

The mixture is preferably cooled to a temperature within the range between about $+50°$ F. and about $-31°$ F. The cooling may be obtained by a suitable refrigerating jacket upon the mixing or storing containers and especially upon the reactor; such refrigerants as liquid propane, liquid sulfur dioxide, liquid ammonia, liquid butane, and the like being especially suitable in the refrigerating jacket, although any refrigerant which under pressure or vacuum will yield the desired temperature is satisfactory. Alternatively, the cooling may be obtained by an internal refrigerant, for which purpose the halogen substituted, aliphatic compounds having appropriate boiling points are useable, and especially satisfactory are the lower boiling paraffin hydrocarbons including liquid ethane, liquid propane, liquid butane, and also liquid or solid carbon dioxide. The refrigeration is, however, preferably obtained by the use of a cooled reflux of refrigerant, the boiling temperature of the mixture being adjusted by the amount of refrigerant present, its temperature being governed by the rate of return of very cold reflux from a reflux condenser cooled by such refrigerants as liquid or solid carbon dioxide, liquid ethane, liquid ethylene or even lower boiling substances in a cooling jacket around the reflux condenser.

The cold unsaturate containing mixture is then polymerized by the addition of an appropriate Friedel-Crafts catalyst. For this purpose any of the Friedel-Crafts catalysts disclosed by N. O. Calloway in his article on "The Friedel Crafts Synthesis" printed in the issue of "Chemical Reviews," published for the American Chemical Society at Baltimore, in 1935, in volume XVII, No. 3, the article beginning on page 327, the list being particularly well shown on page 375, may be used. A particularly satisfactory catalyst is found in an aluminum halo compound, preferably in solution. Aluminum chloride is particularly satisfactory. Aluminum bromo chloride is also highly satisfactory. The double salt of aluminum chloride and aluminum eth-oxide is also highly satisfactory. Alternatively, boron trifluoride, especially in solution, is highly useful, as is titanium tetrachloride, either in liquid form or in solution. The catalyst is preferably used in solution in a low-freezing, non-complex-forming solvent such as ethyl or methyl chloride or carbon disulfide or chloroform or ethylene dichloride, or the like, practically any of the halogenated, aliphatic compounds having melting points below $0°$ C., thereby being low-freezing and capable of boiling away from the solute with a minor or nominal rise in temperature of no more than 1 or $2°$, to leave behind a residue of solute substantially free from solvent, thereby being non-complex-forming being suitable. With some of the catalysts, hydrocarbon solvents are particularly suitable including both boron trifluoride, aluminum bromo chloride, aluminum bromide and aluminum chloro eth-oxide. Also such substances as liquid propane, liquid butane, liquid pentane, and higher compounds including light naphtha are highly satisfactory.

The polymerization reaction is conducted by adding the catalyst solution in sufficient quantity to bring into the mixed unsaturates from 0.1% to 4% of the aluminum salt (determined as percentage of the total amount of unsaturated material present) depending in part upon the catalyst solvent, in part upon the catalyst salt used, and in part upon the percentage completion of the polymerization reaction which is desired.

The catalyst solution may be added in any convenient way as by spraying the liquid catalyst onto the surface of the rapidly stirred polymerizate mixture, or in the form of a fine jet under substantial pressure, into the body of rapidly stirred polymerizate mixture. In either event, the reaction begins with reasonable promptness, depending to some extent upon the unsaturates present. The reaction may start as quickly as a fraction of a second or may start as late as after 20 to 60 minutes. The reaction proceeds with reasonable speed to a partial stage or to completion, as desired, the stage being controlled by the quantity of catalyst added, or by a destruction of the catalyst in the mixture by the addition of alcohol, or ether, or water, or ammonia, or the like when the desired stage of copolymerization is reached.

It should be noted that when a mixture of the type above described is cooled and polymerized, the components do not necessarily copolymerize in the proportion in which they are present in the mixture but one may copolymerize much more rapidly than the other. Accordingly, as the polymerization continues, the composition of the polymer obtained usually changes. Thus, when mixtures of butadiene and diisobutylene are copolymerized, the butadiene polymerizes substantially more slowly than does the diisobutylene; with the result that the first polymer formed is relatively low in butadiene (and as a concomitant characteristic has a relatively low unsaturation). As the polymerization proceeds, the superior speed of polymerization of diisobutylene changes the ratio of butadiene and diisobutylene with the result that the intermediate or middle fraction is polymerized from a mixture containing considerably more butadiene, and accordingly it contains a smaller proportion of mono olefin and would have a substantially higher unsaturation except for the competing cyclization reaction. Near the close of the polymerization reaction, most of the diisobutylene present may have been polymerized, leaving only a small residue to interpolymerize; and, in consequence, the polymer produced in the final stages of the reaction may contain only small amounts of the mono olefin and may contain relatively high amounts of the multi olefin. Thus, if the polymerization is carried to completion, the total amount of polymer will have in it substantially exactly the proportions of mono-ene and multi-ene which were present in the mixture but the polymer will consist of molecules having a wide range of proportions. Conversely, if the polymerization reaction is stopped at a stage well short of completion, the polymer will have a much narrower range of proportions between mono olefin and multi olefin molecules but the relative proportions of mono-ene and multi-ene may depart quite widely from the proportions of the original mixture. According to the procedure of the present invention, many of the multi olefins polymerize relatively slowly in contrast to the mono olefins, and accordingly, when the polymerization reaction is arrested well short of completion, the proportions of copolymerized multi-olefin molecules tends to be substantially lower than the proportion in which they were present in the original mixture. Accordingly, the composition of the final polymer depends in part upon the proportion in the original mixture, in part upon the relative speed or ease of copolymerization of the respective components, and in part upon the stage to which the polymerization is carried.

At the completion of the polymerization reaction, the reaction mixture is conveniently delivered into a tank of warm water or a tank of warm naphtha to volatilize out residual unsaturates and the diluent and catalyst solvent which may be recovered and reused after suitable purification. In warm water a substantial portion of the spent catalyst is washed out. In warm naphtha or other appropriate solvent such as medium or heavy hydrocarbon oil or the vegetable or animal oils, the polymer dissolves, and the spent catalyst is readily washed out from the solution. The polymer forms a slurry in water from which it is readily recovered by straining or filtering and may be dried in an oven or on the mill or in the Banbury mixer, or the like, as desired. The polymer may be precipitated from the naphtha solution by the addition of small amounts of alcohol or ether or ester or aldehyde or organic acid, or the like, or the solvent may be boiled off in any convenient way. The polymer being non-thermosetting, the naphtha solution or oil solution may be heated in a steam jacketed coil and discharged from the outlet of the coil to free the solvent and leave a residue of molten polymer.

The resulting polymer may have a Staudinger molecular weight number ranging from 2,000 or 3,000 up to 50,000 to 75,000, depending upon the multi olefin and mono olefin used, the potency of the catalyst, the polymerization temperature and similar factors. The polymer may have a melting point ranging from about 158° F. to about 302° F., also depending upon the components and their proportion. The polymer may have an iodine number, as determined by the WIJS iodine chloride method ranging from about 30 up to about 300, depending upon the proportion of multi olefin and the particular multi olefin chosen. It may be noted that the proportions given are comparatively close to the rubbery copolymer of a major proportion of isobutylene with a minor proportion of a diolefin. However, the resulting polymer differs very greatly from the rubbery polymer because of the relatively much higher temperature of polymerization, and the use of a mono-olefin having a greater number of carbon atoms per molecule. The previously known copolymer is thermoplastic and has a substantial amount of cold flow but does not melt in the way in which most of the resins do. In sharp contrast, the present material is not an "elastomer" since the elongation at break ranges between 5% and 50% to 100%, whereas the elastomer polymer produced at temperatures below —40° F. has an elongation at break ranging from 250% to 1200%. The present material has an intrinsic viscosity as determined on the resin while in solution in diisobutylene, within the range between 0.01 and 0.23 whereas the elastomer polymer has intrinsic viscosity above 1.25, in the same solvent. This difference in intrinsic viscosity is indicative of a molecular weight which is different in order of magnitude, and of a wholly different chemical configuration in the molecule, which difference is further emphasized by the fact that the present polymer melts to a fluid state at a comparatively low temperature, whereas the elastomer polymer merely softens somewhat but does not melt.

This resin is thermo-plastic, but non-thermosetting, or relatively very slowly thermosetting, and it may be held in molten condition for substantial periods of time without harm. The relatively high reactivity of the polymer makes it possible to combine it with sulfur in a reaction which has some points of analogy to the production of hard rubber, although the raw polymer is in no way similar to crude rubber. The sulfur may be used alone, in which case the mixture will stand relatively long heating, before it sets into a hard, infusible mass. Alternatively, such substances as para quinone dioxime and its analogs and homologs or dinitroso benzene and its analogs and homologs may be used, in which case the material cures to a hard, strong, infusible material in a much shorter length of time.

EXAMPLE 1

A mixture was prepared consisting of 132 parts by weight of butadiene and 108 parts by weight of the octene known as "dimer" or "diisobutylene." Liquid propane was then added to the mixture until a temperature of —6° F. was obtained. This mixture was prepared in a reactor equipped with a reflux condenser cooled by liquid ethane to about —130° F.

When the solution was prepared and cooled, a solution of aluminum chloride in ethyl chloride having a concentration of about 4.3% was added to the reactor in the form of a fine jet into the body of the cold liquid, at such a rate that the reaction temperature was maintained at approximately 0° F. (within 3 degrees above or below) from the refrigeration carried into the solution by the cold reflux from the condenser; and care was taken that the pressure in the reactor did not exceed about 10 pounds per square inch. Approximately 70 parts by weight of catalyst solution were added over a period of 170 minutes to give approximately a 75% yield of copolymer from the mixed unsaturates. It may be noted that the rate of catalyst addition was largely controlled by the capacity of the reflux condenser.

The reaction mixture was then pumped to an agitator containing a relatively large quantity of warm water and a substantial quantity of light naphtha was added to soften the resulting polymer and to bring the viscosity to a reasonable value where the material could be easily handled. The washing was continued with agitation and change of water until a pH of 6.5 was obtained. The polymer and naphtha inter-solution was then pumped through a steam jacketed heat exchanger in which it was heated to a temperature of approximately 329° F. At the exit end of the heat exchanger the solvent naphtha and traces of unsaturates, refrigerant and catalyst solvent flashed off to leave a molten resin having a softening point of 208.4° F. and an iodine number of 145.

The above example shows a proportion of 55% butadiene and 45% of diisobutylene. Similar polymerizations were conducted on mixtures containing 50% butadiene and 50% diisobutylene; and on mixtures containing 60% butadiene and 70% butadiene, in each the remaining 40% and 30% being diisobutylene. The 50%–50% polymerization yielded a material having a slightly lower iodine number and a slightly lower softening point. The other two, the 60% and 70% butadiene polymerizates yielded polymers having substantially higher iodine numbers and the resulting polymers were definitely strongly heat reactive, and upon heating to 392° F. a substantial amount of gelation occurred. That is, the two polymerizates containing the lower butadiene values showed less than about 1½% gel in the fusible resin, whereas the two higher butadiene percentage resins showed from 5% to 10% gel, even though the 60% resin was carried only to the stage of 50% conversion in the polymerization, and the 70% butadiene polymerizate was carried to the stage of only 30% conversion. The presence of 5% to 10% gel very greatly reduced the fluidity of the molten gel and made it not much more than slightly pasty, and further gelation occurs so rapidly that the material could not be satisfactorily dried and processed at elevated temperatures.

EXAMPLE 2

Each of the above resins was used in a standard, 15 gallon length, varnish cook at 560° F. with alkali refined linseed oil. Each of the polymers was steam stripped to remove as much as possible of the volatile residue at as low a temperature as possible, to avoid any additional heat gelation, and, in each instance the wet polymer was dissolved in hot linseed oil. The results are shown in the following table:

Table I

| Butadiene-diisobutylene ratio | 50–50 | 55–45 | 60–40 | 70–30 |
|---|---|---|---|---|
| Heat reactive resin | No | No | Yes | Yes |
| Cooking time in hours | 7–8 | 5 | 4 | 1½ |

It will be noted that the first two resins can be satisfactorily stripped by flashing through a hot coil since the rate of gelation is so low that no harm is done to the resin, whereas the latter two can not be so treated because of the rapid gelation, but must be steam stripped and dried at low temperature or otherwise treated to avoid thermal gelation. It may further be noted that the gain in cooking time between the 60–40 and the 55–45 types is not sufficient to justify the much more difficult processing required of the higher butadiene percentage resin. Thus, the copolymer made from 55 parts butadiene and 45 parts diisobutylene appear to have maximum reactivity in oil, i. e., the shortest cooking time, consistent with a thermal method of recovery.

EXAMPLE 3

A further sample of the 55%–45% resin varnish from Example 2 was thinned to 50% solid content with light naphtha ("Varsol"), and 0.05% of cobalt naphthenate and 0.5% of lead naphthenate were added as dryers and films were formed on steel panels. These films were "set-to-touch" in less than one hour and "hard dry" in 4 hours. After air drying for 48 hours, the films had excellent resistance to cold water after 24 hours soaking; to 3% alkali (caustic soda) after 4 hours soaking, to 5% acid (sulfuric acid) after 24 hours soaking and were only slightly whitened when immersed in boiling water for one hour. The flexibility and adhesion were excellent. These tests showed excellent quality in the varnish prepared from linseed oil and the resins of the present invention.

EXAMPLE 4

This resin showed excellent cooking characteristics in all of the usual drying and baking oils, specific inspection data being shown in the following Table II:

Table II

| Oil | Cooking Temp., °F. | Cooking Time, Hrs. | Final Cure, Pt. Sec. | Thinned (50%) Viscosity, Gardner | Varnish Color, Gardner |
|---|---|---|---|---|---|
| Oiticica oil | 450 | 1½ | 35 | | |
| Tung oil | 450 | 2 | 32 | | 6 |
| Linseed oil | 560 | 5 | 32 | Q | 10 |
| Linseed+25% Tung | 560 | 3½ | 40 | S | 9 |
| Linseed+10% Tung | 560 | 4 | 44 | L | 10 |
| Dehydrated Castor oil | 560 | 4 | 41 | J–K | 8–9 |
| Soybean oil | 560 | 8½ | 28 | O–P | 7–8 |

These results show the excellent quality of this resin in a wide variety of oils.

EXAMPLE 5

A similar mixture was prepared consisting of 225 parts by weight of butadiene and 525 parts by weight of "dimer" (diisobutylene). To this mixture there were then added 900 parts by weight of propane and the mixture was polymerized by the addition thereto of 1100 parts by weight of an ethyl chloride solution of aluminum chloride containing 4.6% of aluminum chloride. The catalyst was added in the form of a fine stream into the rapidly stirred mixture over a length of time of about 45 minutes and the low temperature was maintained by the use of a very cold reflux condenser as in Example 1. The polymerization was carried to approximately 80% conversion of the mixed olefins and the polymerizate mixture was then dumped into a tank of warm water to volatilize out the catalyst solvent, the residual propane and unpolymerized butadiene and dimer.

The resulting polymer was hard and slightly brittle with an iodine number of 30 and a softening point by the ball and ring method of 72°. This product was more highly resistant to heat polymerization than any of the above-mentioned resins, and its relatively low unsaturation made it particularly useful in chemically resistant paints and varnishes, in which respect it was superior to any of the previously mentioned resins. In addition, it is especially useful for mixing with other types of resins and as a softening agent in various types of rubber and rubber-like substances. It is an excellent plasticizer for the elastomers generally, including natural rubber, polychloroprene, the various butadiene type emulsion polymers, and the various low temperature isobutylenic polymers.

These examples show the details of the copolymerization of butadiene with diisobutylene or octene carried out under specific conditions. It is found that under these conditions the dimer copolymerizes at a slightly faster rate than the butadiene. Thus, at 75% conversion, a mixture containing 55 parts of butadiene and 45 parts of dimer will yield a copolymer which shows an average content of about 45 parts of butadiene and 55 parts of dimer (as determined by proximate analysis). These indications being derived from the carbon to hydrogen ratios obtained from combustion analyses, are not sufficiently accurate to show small differences in actual composition, but the values are indicates and are very close to those above stated.

As above pointed out, variables such as the relative proportion, the types, and carbon numbers of the respective components, and the reaction temperature profoundly influence the composition and characteristics of the resulting polymer. In addition, the catalyst concentration, the degree of catalyst dispersion obtained, the presence or absence of diluent and its type and ratio, the percent conversion, and many other variables all affect the ultimate composition of the polymer obtained. The large number of variables in this process make it impossible to lay down any rule to guide those skilled in the art in a determination of the precise mono- and multi-olefins to be chosen, the precise temperature, the precise catalyst, the precise percent conversion and so on, to use to produce a resin having predetermined, precise characteristics. Nevertheless, all of the resins obtained by characteristics within the above pointed out ranges are non-elastomers, relatively hard, tough, fusible resins.

It is of the essence of the present invention that the polymerization reaction is conducted at a temperature within the range between about $-22°$ F. and $+50°$ F. to yield a material which is a non-elastomer but instead is a fusible, hard resin substantially free from gel, but having a structural configuration different from that of the elastomers.

Thus the process of the invention copolymerizes a multi-olefin with an isoolefin at a moderately reduced temperature within the range between about $-22°$ F. and about $+50°$ F. to yield a hard, tough resin which is not an elastomer, but is of relatively low thermo-reactivity and low in gel content, which is particular value as a varnish resin, since it cooks readily in any of the varnish oils to yield a varnish of excellent strength, excellent durability and very high quality in general, and at the same time is readily recovered from the polymerization mixture and purified by a simple heat treatment.

While there are above disclosed but a limited number of embodiments of the process and product of the invention, it is possible to produce still other embodiments without departing from the inventive concept herein disclosed and it is therefore desired that only such limitations be imposed on the appended claims as are stated therein or required by the prior art.

The invention claimed is:

1. A non-thermosetting, non-elastomer, hard, brittle resin containing 45% of combined butadiene and 55% of combined diisobutylene and having an iodine number substantially of the order of 145, a softening point substantially of the order of 208° F., a Staudinger molecular weight number not substantially greater than 2000 and being substantially free from gel and capable of cooking rapidly in varnish oils to produce coating compositions.

2. A varnish composition comprising a natural drying oil and dissolved therein a non-thermosetting, non-elastomer, hard, brittle resin defined in claim 1.

3. A varnish composition comprising linseed oil and dissolved therein in a proportion corresponding to standard 15-gallon length, a hard brittle copolymer resin defined in claim 1.

4. A polymerization process comprising the steps of mixing together from 30% to 55% of a multi-olefin having from 4 to 10, inclusive, carbon atoms per molecule, with from 70% to 45% of a mono-olefin having from 5 to 10 carbon atoms per molecule, cooling the mixture to a temperature within the range between $-22°$ F. and $+50°$ F., polymerizing the cooled mixture by the addition thereto of a fluid Friedel-Crafts catalyst, and quenching the polymerization reaction when the conversion has reached a value not in excess of 75% based on monomers, to produce a hard, brittle resin having an iodine number within the range between 30 and 300, a Staudinger molecular weight number within the range between 2,000 and 75,000 and a melting point within the range between 158° F. and 302° F.

5. A polymerization process comprising the steps of mixing together from 30% to 55% of butadiene with from 70% to 45% of a monoolefin having from 5 to 10 carbon atoms per molecule, cooling the mixture to a temperature within the range between $-22°$ F. and $+50°$ F., polymerizing the cooled mixture by the addition thereto of a fluid aluminum halide catalyst, and quenching the polymerization reaction when the conversion has reached a value not in excess of 75% based on monomers, to produce a hard, brittle resin having an iodine number within the range between 30 and 300, a Staudinger molecular weight number within the range between 2,000 and 75,000 and a melting point within the range between 158° F. and 302° F.

6. A polymerization process comprising the steps of mixing together from 30% to 55% of butadiene with from 70% to 45% of octene, adding to the mixture a liquid diluent selected from the group consisting of alkyl chlorides having less than 3 carbon atoms and paraffin hydrocarbons having 2 to 4 carbon atoms and cooling the mixture to a temperature within the range between $-22°$ F. and $+50°$ F., polymerizing the cooled mixture by the addition thereto of aluminum chloride dissolved in an alkyl chloride of 1 to 2 carbon atoms to produce a hard, brittle resin having an iodine number within the range between 30 and 300, a Staudinger molecular weight number within the range between 2,000 and 75,000 and a melting point within the range between 158° F. and 302° F., and quenching the reaction with water when the conversion has reached a value not in excess of 80% based on the monomers.

7. A polymerization process comprising mixing together 55% of butadiene and 45% of diisobutylene and a hydrocarbon diluent, polymerizing the mixture to 75% conversion at a temperature substantially of $-6°$ F. by the addition thereto of a small amount of Friedel-Crafts catalyst in an alkyl halide solution to produce a hard brittle resin having an iodine number substantially of the order of 145 and a softening point substantially of 208° F.

WILLIAM J. SPARKS.
JOHN D. GARBER.

REFERENCES CITED

The following references are of record in the file of this patent:

UNITED STATES PATENTS

| Number | Name | Date |
|---|---|---|
| 2,039,364 | C. A. Thomas | May 5, 1936 |
| 2,062,845 | C. A. Thomas | Dec. 1, 1936 |
| 2,092,295 | Van Peski | Sept. 7, 1937 |
| 2,122,826 | Van Peski | July 5, 1938 |
| 2,311,004 | Thomas | Feb. 16, 1943 |
| 2,374,242 | Soday | Apr. 24, 1945 |
| 2,384,975 | Sparks | Sept. 18, 1945 |
| 2,389,693 | Sparks | Nov. 27, 1945 |
| 2,476,000 | Sparks | July 12, 1949 |